United States Patent
Bernacchi et al.

[11] Patent Number: 6,162,481
[45] Date of Patent: *Dec. 19, 2000

[54] BREADING CRUMBS

[75] Inventors: Donald B. Bernacchi, Chicago, Ill.; Kenneth S. Darley, Ajax, Canada; Irene Greener Donhowe, LaGrange Park; Kwang L. Rho, Westmont, both of Ill.; Joachim N. C. Baur, Newcastle, Canada; John J. Prisciak, Pickering, Canada; Sergio L. Odorico, Markham, Canada; Michael J. Stephenson, Scarborough, Canada

[73] Assignee: Griffith Laboratories Worldwide, Inc., Alsip, Ill.

[*] Notice: Under 35 U.S.C. 154(b), the term of this patent shall be extended for 1154 days.

[21] Appl. No.: 08/524,763

[22] Filed: Sep. 8, 1995

Related U.S. Application Data

[63] Continuation of application No. 08/204,987, Mar. 2, 1994, abandoned.

[51] Int. Cl.[7] .................................................. A21D 13/00
[52] U.S. Cl. ............................................. 426/549; 426/96
[58] Field of Search ....................................... 426/549, 96

[56] References Cited

U.S. PATENT DOCUMENTS

| | | |
|---|---|---|
| 2,791,509 | 5/1957 | Cosler . |
| 3,092,500 | 6/1963 | Keil . |
| 3,449,132 | 6/1969 | Luksas et al. . |
| 3,653,925 | 4/1972 | Anker et al. . |
| 3,676,158 | 7/1972 | Fischer et al. . |
| 3,794,742 | 2/1974 | Harris et al. . |
| 3,830,941 | 8/1974 | Luft et al. . |
| 4,068,009 | 1/1978 | Rispoli et al. . |
| 4,133,901 | 1/1979 | Fetzer et al. . |
| 4,208,442 | 6/1980 | Evans et al. . |
| 4,260,637 | 4/1981 | Rispoli et al. . |
| 4,272,553 | 6/1981 | Bengtsson et al. . |
| 4,283,425 | 8/1981 | Yuan et al. . |
| 4,504,502 | 3/1985 | Earle et al. . |
| 4,511,583 | 4/1985 | Olson et al. . |
| 4,518,620 | 5/1985 | Monagle et al. . |
| 4,520,034 | 5/1985 | Ishii et al. . |
| 4,762,721 | 8/1988 | Holscher et al. . |
| 4,767,637 | 8/1988 | Ek . |
| 4,877,628 | 10/1989 | Stypula . |
| 4,900,573 | 2/1990 | Meyers et al. . |
| 4,935,251 | 6/1990 | Verhoef et al. . |
| 4,943,438 | 7/1990 | Rosenthal . |
| 4,963,378 | 10/1990 | Bhardwaj . |
| 5,008,121 | 4/1991 | Bernacchi et al. . |
| 5,019,403 | 5/1991 | Krochta . |
| 5,120,562 | 6/1992 | Furcsik et al. . |
| 5,126,152 | 6/1992 | Feeney et al. . |
| 5,164,215 | 11/1992 | Furcsik et al. . |
| 5,171,605 | 12/1992 | Attenburrow et al. ................... 426/94 |
| 5,232,721 | 8/1993 | Polansky . |

FOREIGN PATENT DOCUMENTS

| | | |
|---|---|---|
| 445369 | 11/1990 | European Pat. Off. . |
| 78429 | 12/1982 | Japan . |

OTHER PUBLICATIONS

International Publication No. WO94/13160, published Jun. 23, 1994.

*Primary Examiner*—Carolyn Paden

[57] ABSTRACT

Novel breading crumbs are provided in which a heat-set protein is incorporated into the breading crumbs which may then optionally be coated, and which will provide improved textural qualities to food products to which they are applied with improved retention of such qualities under conditions which normally lead to deterioration of organoleptic properties, including maintaining the cooked food product at an edible temperature for a period of time and maintaining the food product under refrigeration, freezing and freeze-thaw conditions. The breading crumbs preferably are Oriental-style breading crumbs and the heat-set protein preferably is sodium caseinate. The novel breading crumbs may be comminuted and used as a predust, as a batter component, or as a flour breader. Further improvements in organoleptic properties can be obtained using a combination of the comminuted material and the novel breading crumbs in food coating systems.

31 Claims, 1 Drawing Sheet

BREADING CRUMBS

This application is a continuation of application Ser. No. 08/204,987 filed Mar. 2, 1994 now abandoned.

BACKGROUND

The present invention relates to improved breading crumbs for food coating systems which provide coated food products with improved texture, including improved crispness, better holding of crispness under food-heating lights or in holding ovens, and better maintenance of crispness under freezer and refrigerator conditions.

Fried battered and breaded food products including as the substrate fish, seafood, poultry, red meat, vegetables, fruit, cereal-based products and nuts are popular for their crisp texture and golden brown appearance. Such coated food products generally comprise a food substrate to which a variety of combinations of coating materials is applied. The coating materials include tempura or cohesion batters, adhesion batters, predust, and breading crumbs. Depending on the substrate and the organoleptic properties desired, such coating materials may be applied in specific combinations, including, for example, batter and breading crumbs; adhesion batter, breading crumbs, adhesion batter, and breading crumbs; batter, breading crumbs and adhesion batter; predust, adhesion batter and breading crumbs; cohesion batter, predust, adhesion batter and breading crumbs; and batter, predust and batter.

The coated food products, which may be raw, fully cooked, or partially cooked, are frozen or refrigerated for distribution to retail and fast food outlets. The frozen or refrigerated coated food product may be cooked for consumption by any desired procedure, such as by baking, deep fat frying, pan frying or microwaving.

Unfortunately, much of the desirable crispy texture and golden brown appearance is lost, particularly in a fast-food environment, where the coated food product is fried or baked and then held for a period of time, whether under food-heating lights, in a heated holding cabinet, on a steam table, or otherwise. In addition, storage under frozen or refrigerated conditions or under conditions where freeze-thaw cycles may be encountered also reduces the crispness of the cooked products.

Finally, it is generally desirable to improve the organoleptic properties of coated food products, whether fried or otherwise prepared for consumption. The present invention is directed to breading crumbs which provide such improvement, including improved crispness.

SUMMARY

The present invention relates to novel breading crumbs for food coating systems, to the resulting novel coated food products themselves and to methods used in the manufacture of such breading crumbs and coated food products.

In accordance with one aspect of the present invention, there is provided a breading crumb having incorporated therein, about 1 to 10 wt % of at least one heat-set protein and up to 3 wt % added fat, based on the breading crumb weight. Such breading crumbs will be referred to hereinafter as being baked-in. Thus, in accordance with another, preferred aspect of the invention at least 1 wt % of the protein will be incorporated into the crumb and the balance will be coated onto the surface of such baked-in crumb. In a particularly preferred embodiment the level of heat-set protein will be in the range of about 2 to 5 wt % and roughly one-half thereof will be baked-in and one-half coated onto the surface of the baked-in crumb.

The heat-set protein is a casein derivative, such as sodium caseinate, calcium caseinate, or potassium caseinate, or it may be soy protein concentrate or soy protein isolate. Sodium caseinate is the preferred heat-set protein used in the practice of this invention.

The novel breading crumb provided herein may be used as is, as a breading crumb, either dried to a moisture content less than about 12 wt % or in a moist condition. Preferably, such a breading crumb is in the form of an Oriental-style breading crumb of low density, sized so that at least about 15 wt % of the crumbs is retained on an 8 mesh screen. Alternatively, the novel breading crumb may be comminuted to a smaller size for use as: 1) a predust, 2) a batter component or, 3) a flour breader. In a particularly preferred embodiment, a predust formed from the breading crumb of the invention is first applied to a food substrate, followed by a batter coating and then a coating of the breading crumb itself.

DESCRIPTION OF THE DRAWING

These and other features, aspects, and advantages of the present invention will become better understood with reference to the following description, appended claims, and accompanying drawings where:

DESCRIPTION OF THE INVENTION

Figure 1:
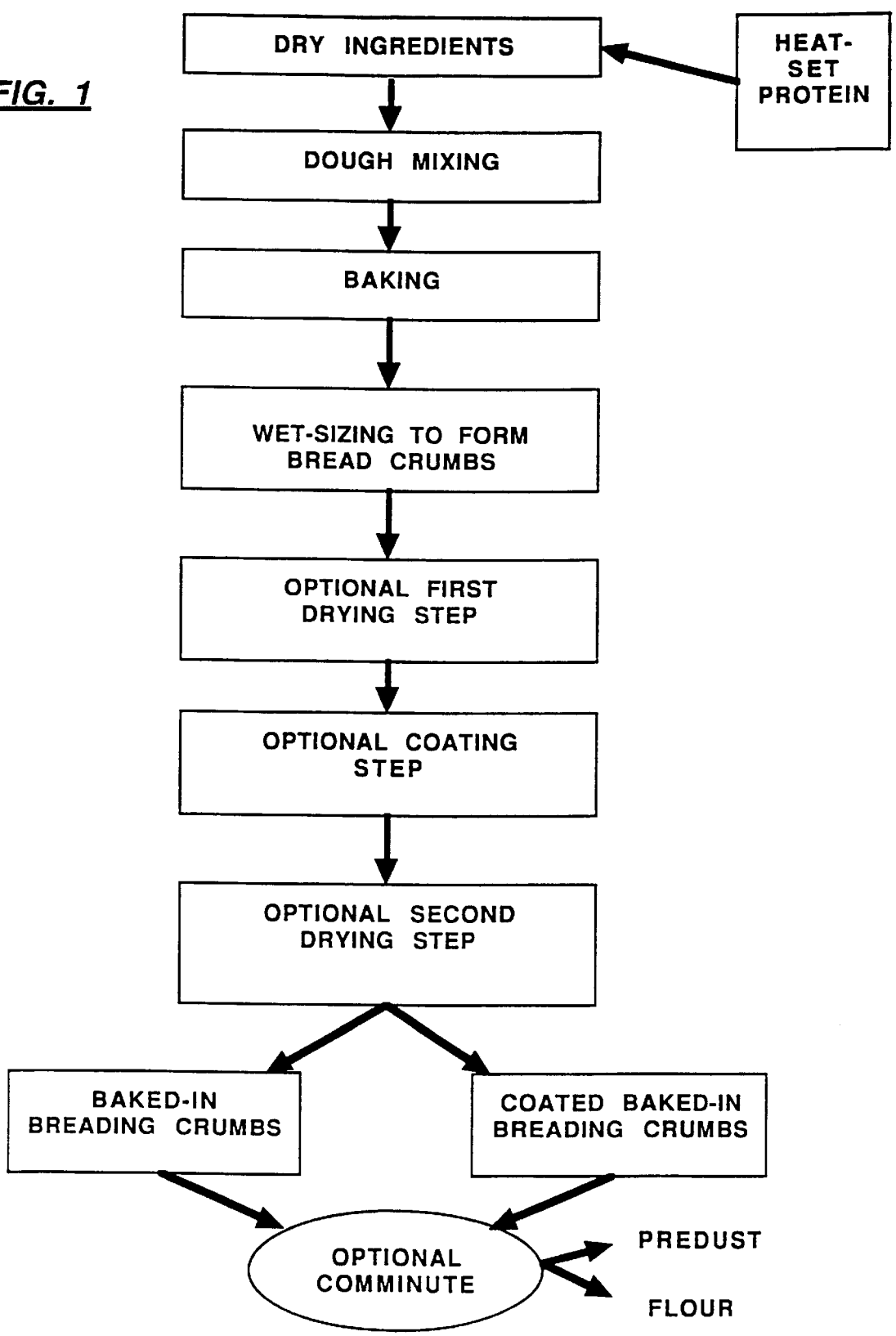
FIG. 1 is a flow diagram depicting a preferred method of the present invention.

In FIG. 1, there is shown a flow diagram illustrating a procedure for forming the novel breading crumb products of the invention. As discussed above, the present invention involves two embodiments, one in which a heat-set protein is baked-in the crumb and another preferred embodiment, in which the heat-set protein is not only baked-in the crumb but also coated onto its surface.

In preparing the breading crumbs, the dry dough-forming ingredients are first mixed together and powdered sodium caseinate or other heat-set protein is incorporated into the dry mixture, which then is formed into a dough. Alternatively, an aqueous dispersion of the heat-set protein may be mixed into the dough. The dough then is baked, preferably following dough stretching as in U.S. Pat. No. 4,423,078, and the dough is wet sized to provide wet-sized breading crumbs. In yet another alternative approach, an aqueous dispersion of the heat-set protein may be coated onto the surface of previously formed crumbs and drawn into the crumb using a vacuum/tumbling method as discussed below.

Wet-sized breading crumbs may have a coating solution of the protein directly applied prior to or during drying to form coated, baked-in crumb or, alternatively, the baked-in wet-sized breading crumbs first are dried, the coating dispersion is applied and the breading crumbs are dried again to provide baked-in coated crumbs. As noted above, it is preferred to apply the coating solution to the wet-sized baked-in breading crumbs in view of the improved texture obtained thereby. Coated wet-sized crumbs may be employed as such, without a drying step.

The breading crumbs resulting from this procedure may be used directly as a breading crumb for foods intended for frying, baking, or microwaving for reconstitution for consumption. Alternatively, the crumb may be comminuted to form a breading crumb of smaller size or fine particles for use as a predust to the coating of a foodstuff, a batter ingredient for the coating, or as a flour breading.

The type of crumb employed affects the textural properties of the novel breading crumbs of the invention, as explained below. Accordingly, the crumb type should be chosen depending on the textural properties sought to be achieved in the coated food product.

For example, one type of crumb which may be employed is an extruded crumb which is fully expanded and porous, and thus will absorb coating substances and bond well with coating systems and materials in the overall coating system. This contributes to textural holding properties in the coated food product.

Alternatively, an extruded crumb having a high degree of gelatinization which has not been permitted to expand and hence is denser may be used. This crumb is harder and hence crunchier which also leads to improved properties on holding. The density of the crumb can be varied as desired, by employing appropriate die configuration, processing conditions, extruder configuration and components used in forming the crumb.

In another approach, a low absorption crumb, such as is made on a sheeted line, may be used to permit the coating to form a good envelope around this denser and more uniform crumb. A porous homestyle crumb, such as is made on a sheeted line or on a loaf line, also may be used. The latter crumb may be yeast leavened and/or chemical leavened and/or leavened by gas addition.

A fully yeast-leavened crumb, prepared by conventional means or on a continuous kneader, may also be used. The crumb made in this process will produce other unique absorption and textural properties in the coated food product.

Oriental-style breading crumbs with their elongate coarse splintered structure are preferred as the breading crumb. Such breading crumbs generally are characterized by low density, usually with a bulk density of about 0.20 to about 0.40 g/cc, preferably about 0.23 to about 0.36 g/cc, and are coarse, usually sized so that at least about 15 wt % of the crumbs is retained on an 8-mesh screen. One preferred particle size distribution is as follows:

| Mesh size | Wt. % |
| --- | --- |
| +3 | 0 |
| +5 | 0 to about 15 |
| +8 | about 20 to 40 |
| +14 | about 25 to 40 |
| +20 | about 10 to 30 |
| +40 | 0 to about 15 |
| −40 | max 10. |

The crumbs employed herein preferably are prepared as described in U.S. Pat. No. 4,423,078, the disclosure of which is incorporated herein by reference. Breading crumbs produced by such procedure and preferably employed herein are characterized by an amylograph of the following characteristics:

| | Brabender Units |
| --- | --- |
| Initial Cold Viscosity | 10 to 50 |
| Peak Viscosity at 95° C. | 600 to 1000 |

-continued

| | Brabender Units |
| --- | --- |
| Minimum Viscosity after 15 min hold | 500 to 800 |
| Final Cold Viscosity | 1800 to 2500 |

The amylograph is determined on a Brabender Amylograph unit using 60 g of breading crumbs ground to pass a 30-mesh screen but to be retained on an 80-mesh screen, added to 450 ml of water with a bowl speed of 75 rpm and a sensing head value of 700 cmg.

The Oriental-style breading crumbs may be produced by forming a leavened dough from bread-forming ingredients, forming a tow from the dough, stretching the tow to about 3 to about 8 times its length to effect elongation of the pores within the leavened dough, baking the stretched dough while retaining the dough in its stretched condition, comminuting the dough to form the breading particles, and drying the comminuted particles to the desired moisture level, generally below about 12 wt %.

In forming the novel breading crumbs herein, the heat-set protein is incorporated into the breading crumb-forming operation at a convenient juncture, depending on the final form of the crumb. For example, the protein may be baked-in the crumb by adding it in dry form to dry mix components from which the dough is formed or by incorporating a dispersion of the protein into the dough prior to stretching and baking the dough. The protein may be added to the dough as an aqueous dispersion which has a protein concentration, based on the dry weight of the protein, of about 5 to 20 wt %, and preferably about 10 to 20 wt %.

When, in the preferred embodiment, the heat-set protein is also provided as a coating on the baked-in crumb, an aqueous protein dispersion may be applied to the crumb while it is still moist, prior to or during the drying step. Alternatively, in a less preferred embodiment, the protein dispersion may be applied to dried baked-in crumbs which then may be redried. In either case, it is preferred that the dispersion have a protein concentration of about 10 to 20 wt %.

The initial bread-forming ingredients used in making the breading crumb may comprise any of the components conventionally used in bread-making and itemized under the Standards of Identity, FDA Regulations 21 C.F.R. 136.110 to 0.180 inclusive. The basic components of any dough are flour and water, the term "flour" including farinaceous flours used alone or in combination with other flours and meals, such as the permitted materials outlined in 21 C.F.R. 137.105 to 0.350 inclusive, as well as those of legumes, rye, sorghum and rice. Usually a major proportion of the flour comprises hard wheat flour.

Varying amounts of dough-forming components may be used, usually including sugar, salt and vegetable shortening in varying proportions, depending on the characteristics desired in the product and the flour used. Other bread-forming components which may be used include oxidizing, maturing and improving agents, such as potassium bromate, cysteine hydrochloride and ascorbic acid. Yeast, and amylolytic and proteolytic enzymes also may be included, to modify texture and flavor in the product. Emulsifiers and cell-wall improvers may be used as well. While it is preferred that no fat be added, there may be up to 3 wt % added fat in the bread-forming ingredients used in making the breading crumb.

Leavening of the dough may be effected utilizing any convenient leavening agent, which may be a chemical leavening agent or gaseous material, such as carbon dioxide, nitrogen, air, or mixtures of gases, alone or in combination with chemical leavening using gas-producing leavening chemicals. Such chemical leavening agents include a combination of sodium bicarbonate and sodium aluminum phosphate or a combination of sodium bicarbonate and monocalcium phosphate or a combination of sodium bicarbonate and sodium acid pyrophosphate.

Yeast leavening may be used but is less preferred since longer holding times are required, thereby increasing equipment space requirements. The presence of more than small quantities of salt tends to inhibit the leavening effect of yeast. Where leavening is effected using gaseous materials, more than the usual small quantities of salt may be used, enabling variations in flavor to be achieved.

Further, where leavening is effected using gaseous materials, alone or in combination with chemical leavening, or with chemical leavening alone, yeast, however, may be used as a flavor enhancer in the dough.

The various proportions of dough-forming ingredients used to form the dough depend on the properties desired, the flour used and also on the nature and choice of components. One suitable composition of ingredients, exclusive of water, which may be utilized in this invention as a dry mix includes:

| | |
|---|---|
| Hard wheat flour | 100 parts by weight |
| Sugar | up to about 5% by weight of flour |
| Salt | up to about 5% by weight of flour |
| Vegetable Shortening | up to about 3% by weight of flour |

In addition, one or more of the following optional components may be present, based on the weight of flour:

| | |
|---|---|
| Yeast | 0 to about 4% by weight |
| Yeast food | about 0.2 to about 0.35% by weight when yeast is present |
| Corn sugar | 0 to about 1.0% by weight |
| Mono and/or diglycerides | 0 to about 0.5% by weight |
| "Tween" surfactant | 0 to about 1.0% by weight |

Another suitable composition of ingredients also useful as a dry mix in this invention, utilizing a mixture of flours, may comprise:

| | |
|---|---|
| Hard wheat flour | about 67 parts by weight |
| Soft wheat flour | about 33 parts by weight |
| Sugar | up to about 5% by weight of flour |
| Vegetable Shortening | up to about 3% by weight of flour |
| Salt | up to about 5% by weight of flour |

In addition, one or more of the following optional components may be present in the latter dry mix, based on the weight of flour:

| | |
|---|---|
| Yeast | 0 to about 4% by weight |
| Yeast food | about 0.2 to about 0.35% by weight when yeast is present |
| Protease | about 10,000 to 50,000 H.U. (hemoglobin units)/100 lbs of flour |
| Amylase | about 2000 to about 8000 SKB units (Standstedt, Keen, and Blish)/100 lbs of flour |
| Mono and/or diglycerides | 0 to about 0.5% by weight |
| Surfactant | 0 to about 1.0% by weight |
| Corn sugar | 0 to about 1.0% by weight |

Flavor-enhancing and texture-modifying premixes or brews may be used to improve texture, flavor, fry tolerance and structure of the product and to provide a wide variety of properties.

The flavor-enhancing and texture-modifying pre-mixes include enzyme systems which are used in a concentrated brew along with a minor proportion, usually less than about 20%. by weight, of the total proportion of flour used and a major proportion, usually about 50 to 80% by weight, of the inlet moisture. The brew is fermented for a short period of time, typically up to about 2 hours at about 32°–41° C., during which time the amylases and proteases have sufficient time to modify the flour and provide a desired texture and other properties in the final product.

A brew mix which may be used in this way contains, based on total flour in the overall dough-forming composition:

| | |
|---|---|
| Hard wheat flour | about 5 to about 20% by weight |
| Water | about 35 to about 55% by weight |
| Proteolytic enzyme | about 25,000 to about 85,000 H.U. per 100 lb of flour |
| Amylolytic enzyme | about 1250 to about 8000 SKB units per 100 lb of flour |

The above-described brew mix, after completion of the fermenting period, is used in this embodiment of the invention in association with such additional water as may be required to provide the desired overall moisture content and with a dry mix comprising, by weight of total flour in the overall dough-forming composition:

| | |
|---|---|
| Hard wheat flour | about 80 to about 95% by weight |
| Vegetable shortening | up to about 3% by weight |
| Chemical leavening agents | up to about 4% by weight |
| Sugar | up to about 5% by weight |
| Salt | up to about 5% by weight |

This dry mix may also contain optional ingredients, based on total flour in the overall dough-forming composition, namely:

| | |
|---|---|
| Mono and/or diglycerides | 0 to about 0.5% by weight |
| Tween surfactant | 0 to about 1.0% by weight |
| Corn sugar | 0 to about 1.0% by weight |

The dough-forming ingredients are mixed together to form a dough.

As noted above, the key component of the novel breading crumbs of the invention is the heat-set protein incorporated into the breading crumb and optionally also coated onto the baked-in crumb.

The heat-set protein may be a derivative of casein, such as sodium caseinate, calcium caseinate, potassium caseinate, or it may be soy protein concentrate or soy protein isolate. Sodium caseinate is preferred. As already noted, depending on the form of the crumb, the heat-set protein can be used in the form of an aqueous dispersion or it may be dry mixed with dough-forming components that form the baked-in crumb.

A wetting agent, chosen for example from among propylene glycol, lecithin, mono- and di-glycerides and their derivatives may be used to improve protein penetration.

Gums also may be employed along with the heat-set protein, either baked-in or coated onto the crumb. Useful gums include Gellan (a microorganism derivative available from Kelco of San Diego, Calif.), gum arabic, xanthan gum, alginates and guar gum.

Various conventional methods may be employed for coating the baked-in crumb, depending on the nature of the crumb and the protein used.

For example, the protein dispersion may be sprayed onto dry crumb followed by drying the coated crumb. Alternatively, the dispersion may be applied to wet crumb and then crumb and coating dried. Another procedure which may be employed involves spraying dry crumb with a solvent such as water or oil, dusting on dry sodium caseinate or other heat-set protein and then drying the coated crumb.

The baked-in crumb may itself be prepared by coating a crumb with the heat-set protein dispersion under vacuum to enhance absorption of the heat-set protein into the internal pore structure of the crumb. A tumbler may be used to which the heat-set protein is introduced. A vacuum is pulled and tumbling or ultimate contact is continued for a period of time, following which release of the vacuum causes the coating material to be absorbed deeply into the crumb structure. By varying the nature of the crumb and the degree of vacuum and other processing conditions, the textural properties of the crumb may be modified and a tailored product can be formed for use in a particular coating system.

The breading crumb provided herein may be employed as is, as a breading component. Alternatively, the breading crumb may be ground to different fine particle sizes corresponding to a predust for application to or to a flour for use as a batter component or as a flour breader applied to a batter-coated substrate in lieu of or in combination with crumbs. In the predust, the particles will have less than about 5 wt % coarser than 16 mesh and up to about 40 wt % passing an 80 mesh screen. In the flour, 100% of the particles will pass through an 80 mesh screen.

A coating system applied to a food product may comprise a single baked-in and optionally coated crumb product or a plurality of different crumbs and crumb products which are combined in the coating system in, eg., the coating (crumbs) and the batter (flour). The use of more than one crumb product in a coating system may be tailored to the specific application, to provide the desired properties.

As noted previously, a food product coating system may comprise various combinations of predust, batters and breading crumbs and any of the various combinations described above may be employed herein with a variety of food substrates, including fish, seafood, poultry, red meat, cheese, vegetables, fruit, cereal-based products and nuts. Following application of the coating components, the food substrate may be at least partially fried to set the batter coating or coatings, usually at a temperature of about 150° to about 230° C. for about 15 to about 60 seconds, or optionally fully cooked, such as in an air impingement oven.

The food product may be fully cooked and consumed or may be stored under refrigeration, usually at about 3° to 7° C., or frozen, usually at a temperature of about −18° to −40° C., for later consumption. When desired, the refrigerated or frozen product may be reconstituted and/or fully cooked for eating, usually by frying, oven baking or microwaving.

The novel breading crumbs provided in accordance with the present invention impart an improved textural quality to food products prepared in this way, both in terms of initial preparation and on holding for later consumption. In addition, the improved textural quality is obtained in refrigerated and frozen food products and in food products subjected to freeze-thaw cycle conditions. Further, when the novel breading crumbs are used as the outer layer and predust formed from the breading crumbs also is employed, then a particularly outstanding improvement in properties is obtained. Finally, the presence of the heat-set protein baked-in and optionally coated onto the breading crumbs when the preferred Oriental-style breading crumbs are used leads to an improvement in machinability of the bread crumbs, arising from an improved durability and a lesser tendency to fracture during breading operations.

A typical adhesion batter formulation which may be employed with the breading crumbs may comprise the following components, expressed in percentage by weight of the dry mixture:

| Ingredient | Range of Concentration | Preferred concentration |
| --- | --- | --- |
| Yellow corn flour | 0–20% | 15% |
| Modified and/or unmodified food starch | 10–90% | 70% |
| Wheat flour | 0–20% | 10% |
| Salt | 2–10% | 3% |
| Sugars | 0–5% | 1.75% |
| Leavening | 0–1% | 0.25% |

The batter is prepared by mixing the dry ingredients and combining them with water, with the ratio by weight of water to dry ingredients generally ranging from about 2:1 to about 1:1, and preferably about 1.25:1.

The following examples illustrate various facets of the invention. It should be understood, however, that these examples are meant to be illustrative of the invention which is not intended to be limited thereto.

EXAMPLES

Example 1

This Example illustrates the preparation of an Oriental-style breading crumb with a heat-set protein baked-in the crumb.

The following ingredients were blended together:

| Ingredient | % by weight |
| --- | --- |
| Hard wheat flour | 89.81 |
| Vegetable oil shortening | 2.04 |
| Leavening | 3.04 |
| Salt | 1.10 |

-continued

| Ingredient | % by weight |
|---|---|
| Dough conditioner | 1.01 |
| Sodium caseinate | 3.00 |
| | 100.00 |

The blended ingredients were processed through a Wenger X-25 single screw extruder under the following conditions:
 Formula, dry weight: 540 Kg/hr
 Vinegar, 200 grain: 16.2 L/hr
 Water: 174 L/hr A tow of formed dough from the extruder was stretched about 5 times and cooked in a Cober continuous microwave tunnel with 10 kilowatts of microwave power at 2450 MHz at a rate of about 2 kilograms per minute. The tow exiting the extruder had a good, strong, extensible characteristic, better than a tow without the addition of sodium caseinate, which resulted in a pronounced enhanced elongate appearance in the finished product.

The cooked tow was then maintained under ambient conditions, after which the tow was shredded in a Mikawa mill to a particle size distribution to pass through a 5 mesh screen and at least 15 percent passes an 8 mesh screen and dried to a moisture content of about 9 to 11 wt % in a forced air Proctor and Shwartz batch dryer at 121° C.

The breading crumb produced by this procedure was evaluated against a breading crumb produced by the same procedure without the addition of sodium caseinate. In the evaluation, chicken strips first were predusted with a standard fine commodity breading and a flour and starch adhesion batter. The battered chicken strips then were coated by the breading crumbs and par-fried at 199° C. for 30 seconds. The resulting breaded chicken fingers were frozen and stored.

For evaluation purposes, the chicken fingers were baked in a conventional oven at 204° C. for 15 to 20 minutes until an internal product temperature of 75° C. was reached. A trained sensory panel selected the breaded chicken fingers prepared using the breading crumb incorporating sodium caseinate as having a crisper, crunchier texture than the breaded chicken fingers prepared using the breading crumb not containing sodium caseinate.

Example 2

The procedure of Example 1 was repeated, but with the addition of 0. 1% (100 g) of xanthan gum to the batch. The tow obtained from the extrusion in this case was very soft and velvety, with excellent extensibility, which provided an exceptional splinter appearance in the finished product.

Example 3

The procedure of Example 1 again was repeated, but with the addition of 0.5w (500 g) of gum arabic to the batch. The tow from this extrusion was soft and velvety, with very good extensibility. This tow produced a very good splinter appearance in the finished product.

The breading crumbs produced in Examples 2 and 3 were evaluated against breading crumb produced by the same procedure but without the addition of the sodium caseinate or gum, in the same manner as described in Example 1. A trained panel selected the crumbs prepared as in Example 3 as having a crisp and tender texture while crumbs prepared as in Example 2 were rated as being crisp and somewhat tender.

Example 4

This Example illustrates the provision of an improvement in organoleptic properties by the utilization of both baked-in breading crumbs and predust formed from such breading crumbs.

The results described below would be obtained with coatings applied to a variety of food substrates, including fish nuggets, fish portions and chicken tenders, as follows. The food products would be subjected to an initial preparation, as follows:

| Food Substrate | Initial Preparation |
|---|---|
| Fish Nugget | recut ½ oz raw cut from a 2 oz frozen cod portion cut from a pressed frozen block and allow to temper at room temperature for 10 minutes, after which surface ice is scraped off. |
| Fish Portion | cut 2 oz frozen cod portion from a pressed frozen block and allow to temper at room temperature for 10 minutes, after which surface ice is scraped off. |
| Chicken Tender | tumble massage and moisture enhance 1¼ oz raw cut of chicken. For every 10 oz of tenders, 1 g salt is added and 2 oz of water for moisture enhancement. |

A variety of coating materials would be applied to the food substrate, including a cohesion batter, an adhesion batter, a predust and a breading crumb. These materials would be formulated as follows:

| Coating Material | Component & Properties | |
|---|---|---|
| Cohesion Batter | Wheat starch | 50% |
| | Hard wheat flour | 50% |
| | | 100% |
| | Dilute this dry mix by 10 parts of solids to 12.5 parts of cold water at 10° to 15° C., to obtain a Stein cup viscosity of 24 to 26 sec. at approx. 20° C. | |
| Adhesion Batter | Modified food starch based batter known as KRUSTO ® Batter 999 which is available from Griffith Laboratories of Alsip, Illinois and Scarborough, Canada. This dry mix would be diluted by 10 parts of solids to 16.5 parts of water at 10° to 15° C. to a Stein cup viscosity of 8 to 10 sec. at approx. 20° C. | |
| Breading Crumb | Breading crumb produced as described in Example 1 with 3 wt % of heat-set protein thereon/therein or produced without such protein ingredient. | |
| Predust | Standard commodity predust or predust formed from breading crumbs produced as described in Example 1, but comminuted to pass through a 16 mesh screen would be used. | |

The procedures and coating sequences employed to coat the various food substrates would be as follows:

| Substrate | Coating Sequence | Comments |
| --- | --- | --- |
| Fish nugget | Cohesion batter/breading | Single pass |
| Chicken tender | Predust/cohesion batter/breading | 1½ pass - predust applied directly to tacky chicken surface |
| Fish portion | adhesion batter/breading cohesion batter/breading | Double pass |

These coated food products would be subjected to par frying directly after the coating steps at 177° to 202° C. for 30 to 35 seconds. For freezing, the par-fried food products would be placed on wire racks and held in a blast freezer for approximately 30 to 40 minutes and then packaged and stored in a conventional freezer until evaluation time.

The coated and par-fried food products would be reconstituted for consumption by oven cooking at 218° C. for appropriate periods of time, namely 14 minutes for fish nuggets, 15 minutes for chicken tenders and 20 minutes for fish portions. The reconstituted food products would be held for 10 minutes after cooking at room temperature and then evaluated for textural qualities by a trained panel after such holding period in terms of enhanced organoleptic properties, with results as set forth in the following Table:

| Novel Breading On Product | Substrate | Approx. Per Cent of Raw Coated Product | Texture Panel Results |
| --- | --- | --- | --- |
| As predust only | Fish portions | 6.0 | Slight improvement in crispness over standard product<br>No significant improvement in persistence of crispness<br>Somewhat less cohesive/tougher than standard |
| As outer breading | Fish nuggets<br>Fish portions | 14.5<br>15.0 | Crisper/crunchier than standard<br>Good persistence of crispness/crunchiness<br>Less cohesive/tougher than standard<br>Improved highlighting<br>two-tone appearance<br>Golden brown color |
| As predust and outer breading | Chicken tenders<br>Fish portions | 4.0 predust<br>19.0 outer breading<br>5.5 predust<br>15 outer breading | Much better crispness/crunchiness<br>Much improved persistence of crispness/crunchiness<br>Low to no cohesiveness/toughness<br>Darker golden brown color<br>and good two-tone appearance |

As may be seen from this Table, food products coated with both predust and crumb prepared in accordance with the invention would exhibit significantly improved textural properties when compared to the predust alone or outer breading crumb alone.

Example 5

This Example illustrates the textural qualities of food products upon freezer storage and freeze-thaw cycling.

In this example, 3.0 kg sample of Oriental-style breading crumbs would be treated under vacuum with 900 g of a 10 wt % dispersion of sodium caseinate in water to provide a coating of 30 g of sodium caseinate solids per kg of breading crumbs (3 wt %) in a rotating coating kettle. The crumbs would be allowed to mix for 3 minutes and then spread on a stainless steel drying tray and dried in a forced air oven at a temperature of 121° to 135° C.

These baked-in breading crumbs as well as Oriental-style breading crumbs which were untreated would be used to coat frozen chicken strips and frozen moisture-enhanced chicken strips, as described below. Moisture-enhanced chicken strips would be obtained by tumbling the chicken strips first for 30 minutes with water and salt to achieve a 20 wt % pickup of water (based on the weight of chicken strips) and a 1 wt % pickup of salt (based on the weight of chicken strips and water). The moisture-enhanced chicken strips would then be frozen.

Freeze-Thaw tests:

Twelve frozen moisture-enhanced chicken strips would be placed on a tray at room temperature and allowed to thaw until tacky (about 10 minutes). The chicken strips would then be predusted with a fine breading, dipped in an adhesion batter and then breaded with the untreated Oriental-style breading crumbs. The coated chicken strips would then be parfried at approximately 199° C. for 30 seconds and refrozen. The coating and par-frying steps would be repeated on twelve additional frozen moisture-enhanced chicken strips using the Oriental-style breading crumbs treated with sodium caseinate and prepared as described above.

The control and test chicken strips would be arranged one deep on a tray and the tray put into a plastic bag and twist-tied closed. Both trays would be placed in a freezer for two days. The chicken strips would then be subjected to three freeze/thaw cycles, wherein the trays were thawed in a refrigerator at 2° C. for 8 hours and then refrozen and left for 40 hours.

The chicken strips would then be cooked by baking in an oven at a temperature of approximately 204° C. until an internal temperature of about 77° C. was reached, after approximately 20 to 25 minutes, and by frying in a deep fryer at a temperature of about 182° C. until an internal temperature of about 77° C. was reached after approximately 4 to 5 minutes.

The cooked chicken strips would then be evaluated for textural qualities by a trained panel. In the case of both the oven-baked and the deep-fried chicken strips, the chicken strips with treated crumb would have better freeze-thaw stability of organoleptic qualities than the chicken strips with untreated crumb.

Freeze Storage Tests:

Twelve plain frozen chicken strips would be dipped in a cohesion batter and then breaded with untreated Oriental-style breading crumbs. The coated chicken strips would then be parfried at about 199° C. for 30 seconds and refrozen. The procedure would be repeated using the sodium caseinate baked into Oriental-style breading crumbs to produce twelve additional coated chicken strips. In addition, duplicate sets of samples of each of the treated and untreated crumbs would be prepared.

The four groups of frozen breaded chicken strips would be placed in a freezer at about −20° C. and evaluated after 2 days of freezer storage and after 14 days of freezer storage. Each group of frozen breaded chicken strips would be cooked by baking in an oven at a temperature of about 204° C. until an internal temperature of about 77° C. was reached after approximately 20 to 25 minutes and by frying in a deep fryer at a temperature of about 182° C. until an internal temperature of about 77° C. was reached after 4 to 5 minutes.

In all cases, the chicken strips prepared with the treated Oriental-style breading crumbs would have better frozen storage stability of organoleptic properties than chicken strips prepared with untreated Oriental-style breading crumbs.

Example 6

This example illustrates how protein concentration could affect the textural properties of a battered and breaded product.

Two dispersions of sodium caseinate in water (10% by weight sodium caseinate) would be prepared using water at either 10° C. or 66° C. A third dispersion containing 17.5% by weight sodium caseinate in water would be prepared using 70° C. water and held for 4 hours. The dispersions would then be sprayed onto baked-in Oriental-type breading crumbs (prepared as in Example 1) in a rotating tumbler at a rate to deliver 3% wt sodium caseinate on the crumb. The coated crumbs would be mixed for 3 minutes and then spread onto a stainless steel drying sheet and dried at 121–135° C.

Chicken strips would then be prepared to evaluate the crumbs in a manner identical to that described in Example 3, except for the final breading which was either one of the three sodium caseinate-coated baked-in crumbs or uncoated Oriental-style breading (used as a control). Coated chicken strips would be parfried at about 1990C for about 30 seconds and frozen.

After two days of frozen storage the chicken strips would be baked-in an oven at 204° C. until an internal temperature of about 77° C. was reached. The cooked chicken strips would then be evaluated for texture by an experienced texture panel.

All chicken strips breaded with coated crumbs would be crisper and/or crunchier than chicken strips breaded with uncoated crumbs. The chicken strips coated with crumbs prepared from the 17.5% sodium caseinate dispersion would be the crispiest and most desirable. The products coated with crumbs prepared from the 10% sodium caseinate dispersion coating would be crisp and very acceptable, but not to the same degree as the crumbs prepared with the 17.5% sodium caseinate.

The results outlined in the example indicate the range of textures that can be achieved by manipulating the concentration of the protein dispersion.

While particular embodiments of the invention have been shown and described, it will be obvious to those skilled in the art that various changes and modifications may be made therein without departing from the spirit and scope of the invention and, therefore, it is intended in the appended claims to cover all such changes and modifications which fall within the true spirit and scope of the invention.

What we claim is:

1. A breading crumb product for application to a food substrate comprising, before application to the substrate, a breading crumb having incorporated therein about 1 to 10 wt % of at least one heat-set protein and up to 3 wt % added fat.

2. The breading crumb product of claim 1 wherein said breading crumb is chosen from the group consisting of Oriental crumbs, extruded crumbs which are fully expanded and porous, extruded crumbs which are unexpanded, low absorption crumbs, porous homestyle crumbs, and fully yeast leavened crumbs.

3. The breading crumb product of claim 1 in which said breading crumb is an Oriental breading crumb having a density of about 0.20 to about 0.40 g/cc and sized so that at least about 15 wt % crumb is retained on an 8 mesh screen.

4. The breading crumb product of claim 3 wherein said Oriental breading crumb has a density of about 0.23 to about 0.36 g/cc and a particle size distribution, as follows:

| Mesh size | Wt. % |
| --- | --- |
| +3 | 0 |
| +5 | 0 to about 15 |
| +8 | about 20 to 40 |
| +14 | about 25 to 40 |
| +20 | about 10 to 30 |
| +40 | 0 to about 15 |
| −40 | max 10. |

5. The breading crumb product of claim 3 wherein said Oriental breading crumb is formed by the steps of forming a leavened dough from bread-forming ingredients and at least one leavening agent, forming a tow of the leavened dough, longitudinally stretching the dough tow to about 3 to about 8 times its initial length, baking the stretched dough while maintaining the dough in stretched condition, and comminuting the baked dough to particulate form.

6. The breading crumb product of claim 1 wherein said breading crumb has a moisture content below about 12 wt %.

7. The breading crumb product of claim 1 wherein said heat-set protein is chosen from the group consisting of sodium caseinate, calcium caseinate, potassium caseinate, soy protein concentrate, and soy protein isolate.

8. The breading crumb product of claim 1 wherein said heat-set protein is sodium caseinate.

9. The breading crumb product of claim 1 wherein about 2 to 5 wt % of at least one heat-set protein is incorporated into said crumb.

10. The breading crumb product of claim 1 wherein said breading crumb includes incorporated therein at least one gum.

11. The breading crumb product of claim 10 wherein said gum is chosen from the group consisting of Gellan, gum arabic, xanthan gum, alginates and guar gum.

12. The breading crumb product of claim 1 in which at least one heat-set protein is applied to the surface of said breading crumb and the total amount of said heat-set protein incorporated into said crumb and coated onto said crumb is about 1 to 10 wt %.

13. The breading crumb product of claim 12 in which said heat-set protein is chosen from the group consisting of sodium caseinate, calcium caseinate, potassium caseinate, soy protein concentrate, and soy protein isolate.

14. The breading crumb product of claim 12 in which said heat-set protein is sodium caseinate.

15. The breading crumb product of claim 1 in which said crumb is comminuted into a pre-dust having particles less than 5 wt % coarser than 16 mesh and up to 40 wt % passing an 80 mesh screen.

16. The breading crumb product of claim 1 in which said crumb is comminuted into a flour having 100% of the particles passing through an 80 mesh screen.

17. A breading crumb product for application to a food substrate comprising, before application to the substrate, a breading crumb having incorporated therein and coated thereon a total of about 1 to 10 wt % of at least one heat-set protein.

18. A food product comprising a food substrate coated with batter and a breading crumb product, said breading crumb product having incorporated therein, before application to the substrate, about 1 to 10 wt % of at least one heat-set protein.

19. A food product comprising a food substrate coated with a predust, a batter and a breading crumb product, said predust and said breading crumb product having incorporated therein, before application to the substrate, about 1 to 10 wt % of at least one heat-set protein.

20. A food product comprising a food substrate coated first with a predust comprising a comminuted breading crumb product having incorporated therein, before application to the substrate, about 1 to 10 wt % of at least one heat-set protein, and then with a batter layer.

21. The food product of claim 18 in which at least one heat-set protein is applied to the surface of said breading crumb.

22. The food product of claim 19 in which at least one heat-set protein is applied to the surface of said breading crumb.

23. The food product of claim 20 in which at least one heat-set protein is applied to the surface of said breading crumb.

24. A method of preparing a breading crumb product for later application to a food substrate comprising:

a) preparing a breading crumb from dry and wet ingredients, in a conventional bread crumb-forming operation;

b) incorporating into the breading crumb-forming preparation at a convenient juncture, a heat-set protein chosen from the group consisting of sodium caseinate, calcium caseinate, potassium caseinate, soy protein caseinate, and soy protein isolate; and c) completing the preparation of said breading crumb.

25. The method of claim 24 in which said protein is added in dry form to the dry ingredients from which the dough is formed for producing said breading crumb.

26. The method of claim 24 in which a dispersion of said protein is formed and said protein dispersion is incorporated into the dough for producing said breading crumb.

27. The method of claim 24 in which a dispersion of said protein is formed and applied to the surface of said breading crumbs under vacuum to thereby cause said protein to be absorbed into the internal pore structure of said crumbs.

28. The method of claim 24 in which, after preparation of said breading crumb product, a heat-set protein is applied to the surface thereof.

29. The method of claim 28 in which said heat-set protein is applied as an aqueous protein dispersion.

30. The method of claim 29 in which said dispersion has a protein concentration of about 10 to 20 wt %.

31. The method of claim 28 in which the surface of said breading crumb is wetted with a solvent and said heat-set protein in dry powder form is dusted thereon.

* * * * *